United States Patent
Elbaz et al.

(10) Patent No.: US 9,800,033 B1
(45) Date of Patent: Oct. 24, 2017

(54) OUTLET COVER SYSTEM WITH FIXED ANCHOR

(71) Applicant: SUPERFLEX LTD., Brooklyn, NY (US)

(72) Inventors: Michael M. Elbaz, New York, NY (US); Gil H. Elbaz, Neponsit, NY (US)

(73) Assignee: SUPERFLEX LTD., Brooklyn, NY (US)

( * ) Notice: Subject to any disclaimer, the term of this patent is extended or adjusted under 35 U.S.C. 154(b) by 0 days.

(21) Appl. No.: 15/353,229

(22) Filed: Nov. 16, 2016

(51) Int. Cl.
*H02G 3/08* (2006.01)
*H02G 3/18* (2006.01)
*H01R 13/52* (2006.01)
*H02G 3/14* (2006.01)

(52) U.S. Cl.
CPC ......... *H02G 3/081* (2013.01); *H01R 13/5213* (2013.01); *H02G 3/14* (2013.01); *H02G 3/18* (2013.01)

(58) Field of Classification Search
CPC . H02G 3/081; H02G 3/14; H02G 3/18; H01R 13/5213
USPC .......................................................... 174/67
See application file for complete search history.

(56) References Cited

U.S. PATENT DOCUMENTS

| | | | |
|---|---|---|---|
| 8,324,516 B1* | 12/2012 | Gretz ............... | H02G 3/083 174/650 |
| 8,558,111 B1* | 10/2013 | Baldwin ............ | H02G 3/14 174/66 |
| 9,219,357 B1* | 12/2015 | Elbaz ............... | H02G 3/081 |
| 9,478,956 B1* | 10/2016 | Elbaz ............... | H02G 3/088 |

* cited by examiner

*Primary Examiner* — Dhirubhai R Patel
(74) *Attorney, Agent, or Firm* — Moritt Hock & Hamroff LLP; Steven S. Rubin, Esq.

(57) ABSTRACT

Technologies are described for an outlet cover system. The systems may include a cover, base and coupling system. The base and cover of the outlet cover system may be joined using the coupling system. The coupling system may include a bottom half and a top half. The bottom half and top half may be joined using an anchor. The anchor may include an anchor head, anchor shaft and anchor lid. The anchor head includes flares which can compress and expand to prevent its removal from the coupling system. The joining of the bottom and top half of the coupling system allows the outlet cover system to move between open and closed positions.

20 Claims, 6 Drawing Sheets

OUTLET COVER SYSTEM WITH FIXED ANCHOR

BACKGROUND

A outlet cover system may be installed outside of a home or business and may provide protection to an electrical device. The outlet cover system may be exposed to weather conditions during operation.

SUMMARY

In some examples, outlet cover systems are generally described. The outlet cover system may include a base, an adapter plate, a cover and a coupling system. The base may include a top, a bottom, a first wall, a second wall, a third wall, and a fourth wall. The first, second, third and fourth walls may be disposed between the top and the bottom. The adapter plate may include walls effective to define an opening to permit access to the face of an electrical device. The adapter plate may be sized and shaped so as to fit within the first, second, third and fourth walls. The coupling system may be effective to join the cover and the base. The coupling system may include a first half and a second half. The first half may attach to the base. The first half may include a base post. The base post may include walls effective to define a first void with a first cross-section. The second half may attach to the cover. The second half may include a follower post and a receiver post. The follow post may include walls effective to define a second void with the first cross-section. The receiver post may include walls effective to define a third void with a second cross-section. The second cross-section may be larger than the first cross-section.

In some examples, methods for forming an outlet cover system are generally described. The methods may include joining a cover with a base. The base may include a top, a bottom, a first wall, a second wall, a third wall, and a fourth wall. The first, second, third and fourth walls may be disposed between the top and the bottom. The method may also include placing an adapter plate inside the base. The adapter plate may include walls effective to define an opening to permit access to the face of an electrical device. The adapter plate may be sized and shaped so as to fit within the first, second, third and fourth walls. The method may also include inserting an anchor into a coupling system. The coupling system may be effective to join the cover and the base. The coupling system may include a first half and a second half. The first half may be attached to the base. The first half may include a base post. The base post may include walls effective to define a first void with a first cross-section. The second half may be attached to the cover. The second half may include a follower post and a receiver post. The follower post may include walls effective to define a second void with the first cross-section. The receiver post may include walls effective to define a third void with a second cross-section. The second cross-section may be larger than the first cross-section.

In some examples, outlet cover systems are generally described. The outlet cover systems may include a base, a cover and a coupling system. The base may include a top, a bottom, a first wall, a second wall, a third wall, and a fourth wall. The first, second, third and fourth walls may be disposed between the top and the bottom. The coupling system may be effective to join the cover and the base. The coupling system may include a first half and a second half. The first half may be attached to the base. The first half may include a base post. The base post may include walls effective to define a first void with a first cross-section. The second half may be attached to the cover. The second half may include a follower post and a receiver post. The follower post may include walls effective to define a second void with the first cross-section. The receiver post may include walls effective to define a third void with a second cross-section. The second cross-section may be larger than the first cross-section.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
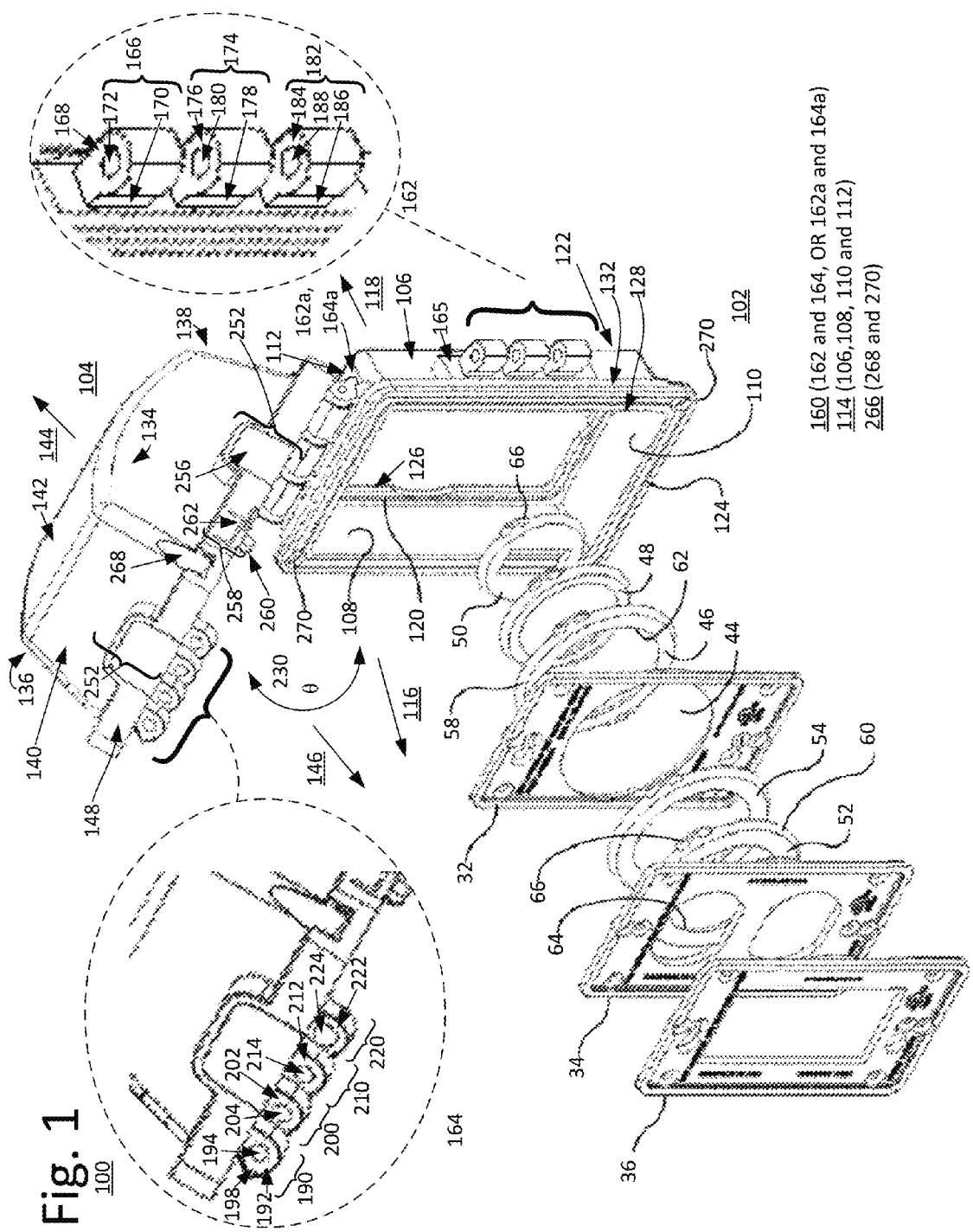
FIG. 1 is a front perspective exploded view of an outlet cover system in an open position.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

With reference to FIG. 1, an outlet cover system 100 may include a base 102 a cover 104, and a coupling system 160. As is explained in more detail below, coupling system 160 may be used to couple base 102 to cover 104 so that cover 104 may rotate with respect to base 104 and thereby move outlet cover system 100 between an open and a closed position. Outlet cover system 100 may include adapter plates 32, 34 and 36—discussed in more detail below.

Base 102 is comprised of walls 114 (including walls 106, 108, 110, and 112). Base 102 includes a top 116 and a bottom 118. Walls 114 are disposed between top 116 and bottom 118. Walls 106, 108, 110 and 112 each have the same height and are tapered inwardly toward an interior of base 102. Respective distances between walls 106, 108, 110 and 112 taper from a farthest distance apart, near top 116, and a smallest distance apart, near bottom 118. Walls 106, 108 are approximately the same length and run parallel to each other. Walls 110, 112 are approximately the same length and run parallel to each other. Walls 106, 108 are longer than walls 110, 112.

Near bottom 118 is an inner ridge 120 which extends inwardly from walls 114. Inner ridge 120 includes an indentation 126 whose dimensions are designed to fit the shape of adaptor plates 32, 34, and 36, as discussed below. Attached to bottom 118 of base 102 may be a sealant 122 whose shape is defined by walls 114 and inner ridge 120.

Near top 116 is an outer ridge 124 which extends outwardly from walls 114. Referring now to both FIGS. 1 and 2, outer ridge 124 is comprised of an inner lip 128, an indent 130 and an outer lip 132. The boundaries of inner lip 128 are defined by the boundaries of inner lip 150 (discussed in more detail below). The boundaries of inner lips 150, 128, allow inner lips 150, 128 to become flush when base 102 and cover 104 are in closed position.

Along outer ridge 124, at a point where walls 112 and 108 meet and where walls 106 and 110 meet, is a bottom half 270 of a hasp system 266, as explained below. Attached to the outside of walls 106 and 112 is bottom half 162 of coupling system 160, as explained below.

Focusing again on FIG. 1, cover 104 is comprised of walls 134, 136, 138, 140 and 142. Walls 134, 136 are approximately the same length and run parallel to each other. Walls 138, 140 are approximately the same length and run parallel to each other. Walls 134, 136 are longer than walls 138, 140. Cover 104 includes a top 144 and a bottom 146. Wall 142 is located near top 144 and positioned adjacent to walls 134, 136, 138 and 140. Near bottom 146 is an outer ridge 148 which extends outwardly from walls 134, 136, 138, 140. Referring again to FIGS. 1 and 2, outer ridge 148 is comprised of inner lip 150, outer lip 156, at least one top half 164 of coupling system 160, at least one top half 268 of hasp system 266, and a latch 258 (coupling system 160, top half 164, latch 258, hasp system 266 and top half 268 being discussed in more detail below). Outer lip 156 is located more outwardly on outer ridge 148 than inner lip 150. Outer lip 156 is a greater height than inner lip 150. Attached to outer ridge 148 near walls 136 and 138 is top half 164 of coupling system 160, as explained below.

Figure 3:
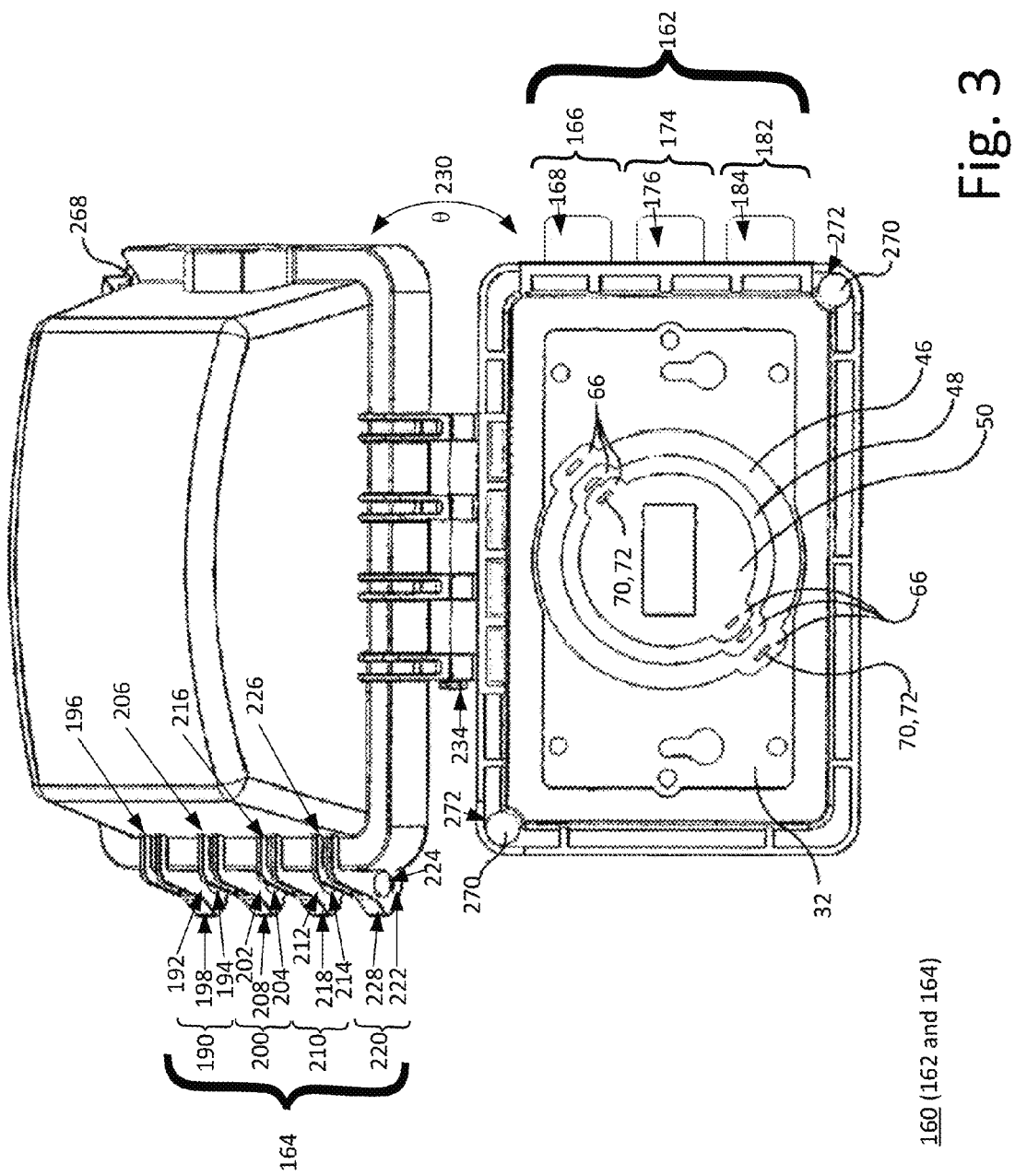
FIG. 3 is a rear view of the outlet cover system of FIG. 1.

Referring now to FIGS. 1 and 3, coupling system 160 may include a bottom half 162 and a top half 164, or a bottom half 162a and a top half 164a. The combination of bottom half 162 and top half 164 allows base 102 and cover 104 to be joined to form outlet cover system 100. Bottom half 162 and top half 164 may be joined by mating their respective halves at walls 112 and 138 to form a vertical opening configuration (shown in FIG. 1). Alternatively, bottom half 162a and top half 164a may also be joined by rotating cover 104, 180 degrees and mating bottom half 162a and top half 164a at walls 106 and 136 to form a horizontal opening configuration (shown in FIG. 3). Bottom half 162 or 162a is comprised of base posts 166, 174, 182 and a base platform 165. Base platform 165 is rectangular in shape and is dimensioned as to allow base posts 166, 174 and 182 to be attached to the outwardly side of base platform 165.

Base post 166 is comprised of a hollow cylinder 168 and a post platform 170. Hollow cylinder 168 has walls effective to define a cylindrical void 172 with a cross-section sized so as to receive an anchor 234 (explained with reference to FIG. 4).

Base post 174 is comprised of a hollow cylinder 176 and a post platform 178. Hollow cylinder 176 has walls effective to define a cylindrical void 180 with a cross-section sized so as to receive anchor 234.

Base post 182 is comprised of a hollow cylinder 184 and a post platform 186. Hollow cylinder 184 has walls effective to define a cylindrical void 188 with a cross-section sized so as to receive anchor 234.

Focusing on FIG. 3, top half 164 is comprised of follower posts 190, 200, 210 and a receiver post 220. Follower post 190 is comprised of a hollow cylinder 192, a stopper 198 and a post platform 196. Hollow cylinder 192 has walls effective to define a cylindrical void 194 with a cross-section sized so as to receive anchor 234. Stopper 198 is shaped and positioned to hinder cover 104 from swinging open with respect to base 102 beyond a threshold angle 230. Angle 230 may be the point where stopper 198 and base platform 165 contact when base 102 and cover 104 are joined.

Follower post 200 is comprised of a hollow cylinder 202, a stopper 208 and a post platform 206. Hollow cylinder 202 has walls effective to define a cylindrical void 204 with a cross-section sized so as to receive an anchor 234. Stopper 208 is shaped and positioned to hinder cover 104 from swinging open with respect to base 102 beyond threshold angle 230.

Follower post 210 is comprised of a hollow cylinder 212, a stopper 218 and a post platform 216. Hollow cylinder 212 has walls effective to define a cylindrical void 214 with a cross-section sized so as to receive anchor 234. Stopper 218 is shaped and positioned to hinder cover 104 from swinging open with respect to base 102 beyond threshold angle 230.

Receiver post 220 is comprised of a hollow cylinder 222, stopper 228 and post platform 226. Hollow cylinder 222 has walls effective to define a cylindrical void 224 with a cross-section sized so as to receive anchor 234. The cross-section of cylindrical void 224 is larger than the cross-sections of cylindrical voids 172, 180, 188, 194, 204, 214. Stopper 228 is shaped and positioned to hinder cover 104 from swinging open with respect to base 102 beyond angle 230.

Figure 4:
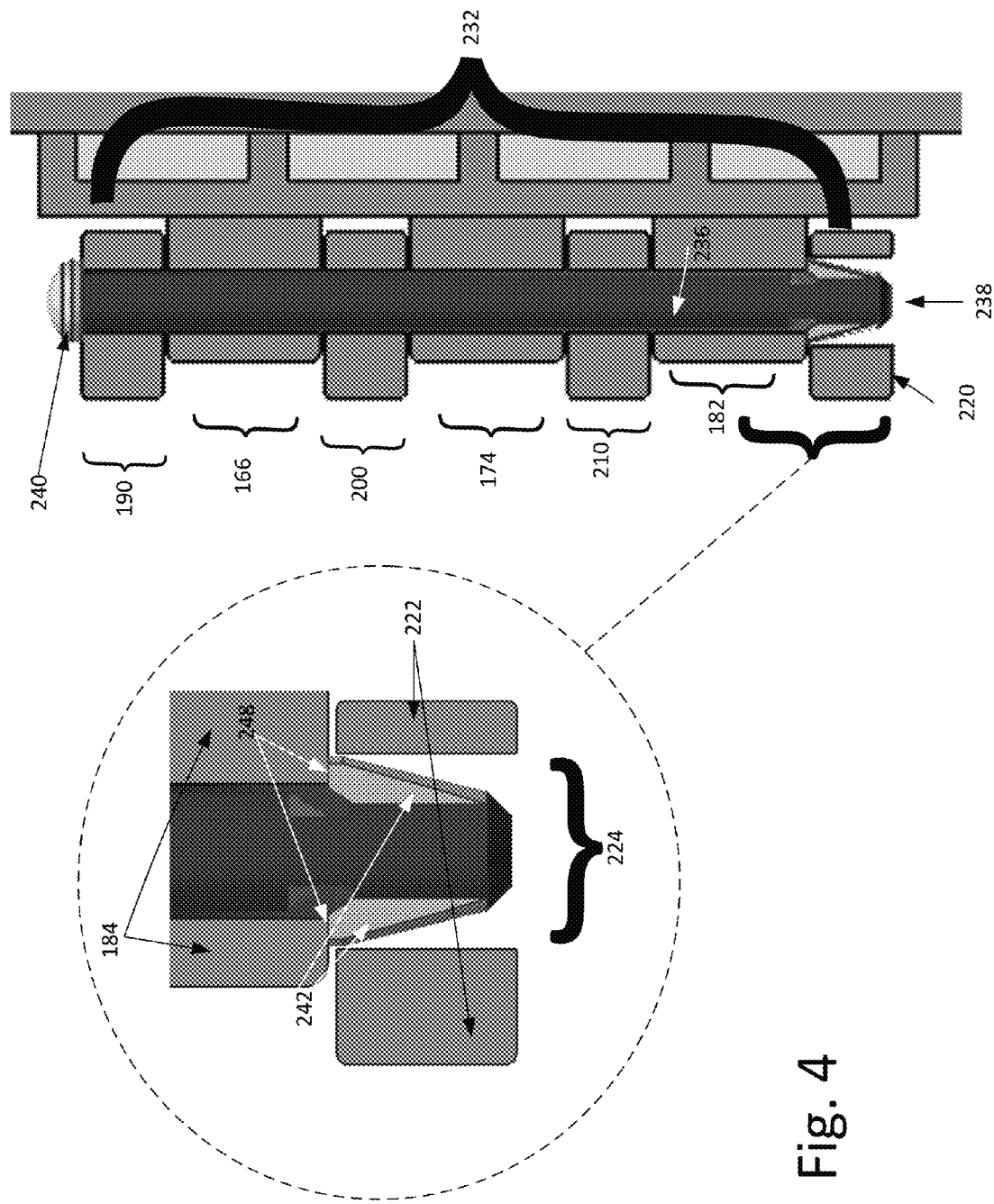
FIG. 4 is a side cut-away view of a coupling system of the outlet cover system of FIG. 1.
Figure 5:
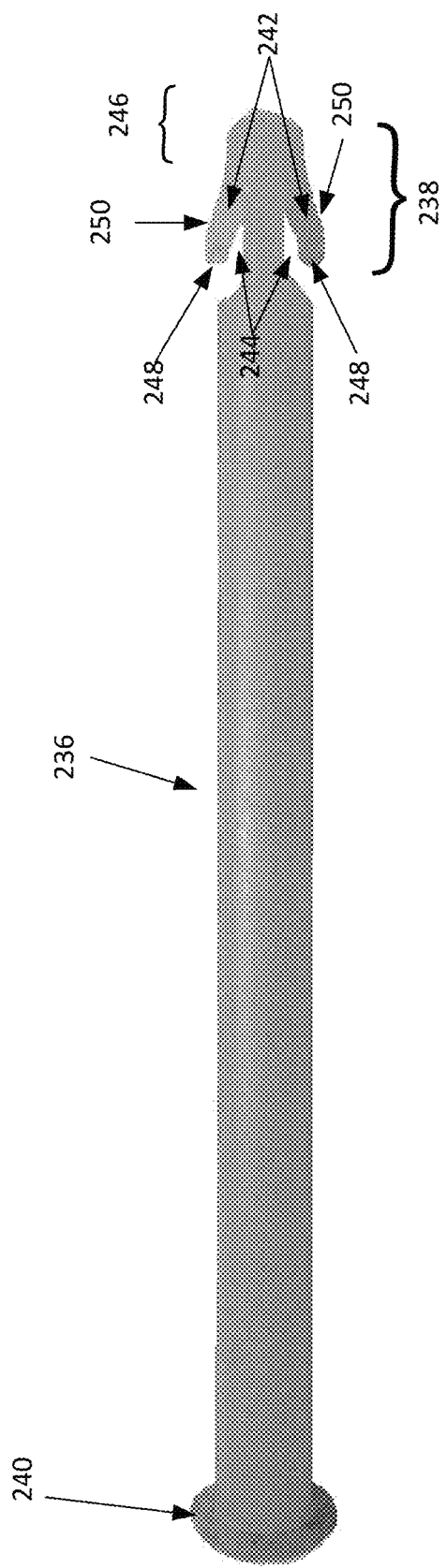
FIG. 5 is a side view of an anchor.

Reference is now made to FIGS. 4 and 5, when base 102 is joined with cover 104, follower posts 190, 200, 210, base posts 166, 174, 182, and receiver post 220 may be aligned to define a channel 232 to allow an anchor 234 to pass through cylindrical voids 172, 180, 188, 194, 204 and 214. Receiver post 220 is located at the end of channel 232.

Anchor 234 is comprised of an anchor shaft 236, an anchor head 238 and an anchor lid 240. Anchor head 238 is comprised of at least two flares 242 and a tip 246. Anchor head 238 includes walls that device at least two flare recesses 244 shaped to receive flares 242 when flares 242 are in a compressed state. Tip 246 is rounded and thereby impedes anchor head 238 from being grabbed. Tip 246 is sized to fill a majority of cylindrical void 224 thereby obstructing tools from entering cylindrical void 224 and preventing flares 242 from being grabbed. Flares 242 are comprised of a flexible material, such as spring steel or bendable steel. Flares 242 include an outer edge 248 and a frontal edge 250. Flares 242 are shaped so when flares 242 enter cylindrical voids 172, 180, 188, 194, 204, 214, frontal edge 250 presses against hollow cylinders 168, 176, 184, 192, 202, 212 (FIG. 1) compressing flares 242 into flare recesses 244. Flares 242 are further shaped so that when flares 242 enter cylindrical void 224, pressure from hollow cylinders 168, 176, 184, 192, 202, 212 is released and flares 242 expand outwardly, as shown in FIG. 4. Flares 242 are sized so when expanded, outer edge 248 extends further outwardly than the cross-sections of cylindrical voids 172, 180, 188, 194, 204, 214. The dimensions of outer edge 248 and hollow cylinders 168, 176, 184, 192, 202, 212, are designed to prevent flares from reentering cylindrical voids 172, 180, 188, 194, 204, 214 and permanently preventing anchor 234 from being withdrawn.

Anchor lid 240 is shaped to prevent anchor lid 240 from passing through cylindrical voids 172, 180, 188, 194, 204, 214 and 224. Anchor lid 240 may be rounded or chamfered. Once anchor head 238 has been inserted into cylindrical void 224 and flares 242 have expanded, the pressure created by outer edge 248 pressing against hollow cylinder 184 pulls anchor lid 240 flush with hollow cylinder 192 preventing anchor 234 from being removed from channel 232 without damage to flares 242. Referring again to FIG. 1, along walls 134 and 140 are knockouts 252 and 256. Knockouts 252 and 256 are offset from and also thinner than walls 134 140 and outer ridge 148, to allow for removal.

Figure 2:
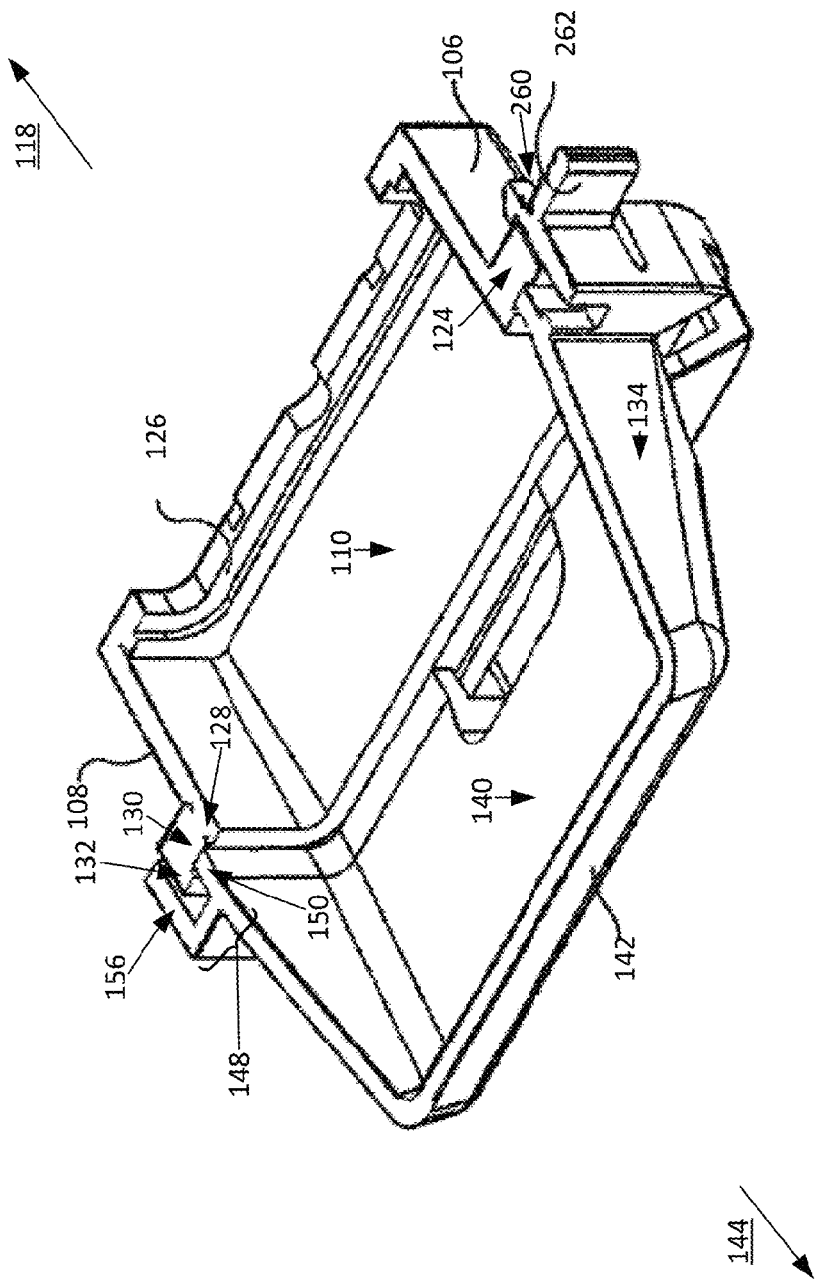
FIG. 2 is side perspective enlarged cut-away view of the outlet cover system of FIG. 1 in a closed position.

Referring now to FIGS. 2 and 3, along outer ridge 148 by wall 134 is a latch 258. Latch 258 is comprised of a hook 260 and a push lever 262. Hook 260 is shaped to allow hook 260 to grip outer ridge 124 of base 102 when cover 104 and base 102 are in closed position. Push lever 262 is a plank 264 with a ribbed surface designed to allow hook 260 to be released from outer ridge 124 when pressure is applied.

Referring now to FIGS. 1 and 3, near bottom 146 of cover 104 at the point where walls 134 and 140 meet is top half 268 of a hasp system 266. Hasp system 266 is comprised of top half 268 and bottom half 270. Top half 268 is comprised of a concave region of walls 134 140 and outer ridge 148, whose dimensions define a void designed to allow a shackle of a lock to pass through. Bottom half 270 includes a circular outline 272 formed by an indentation in outer ridge 148. Hasp system 266 is designed to allow a shackle of a lock to restrict outlet cover system 100 from opening when base 102 and cover 104 are joined.

Figure 6:
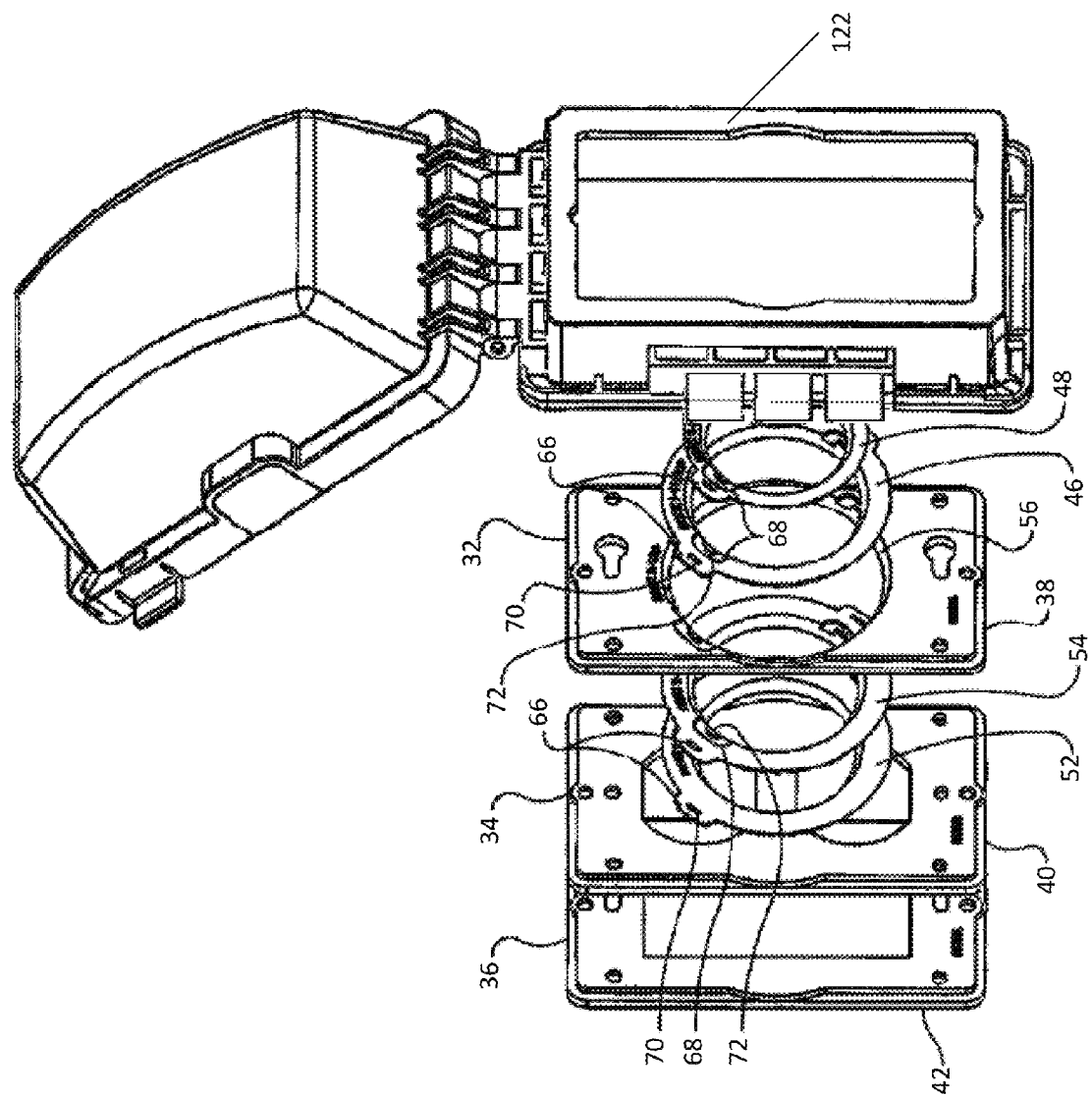
FIG. 6 is a rear elevational exploded view of the outlet cover system in the open position.

Referring to FIGS. 1 and 6, outlet cover system 100 includes a plurality of adapter plates 32, 34 and 36 placed therein, each of which being shaped to fit within walls 106, 108, 110 and 112. Each of adapter plates 32, 34, and 36 includes a peripheral flange of reduced thickness 38, 40, 42 which is dimensioned to fit in indentation 126.

Adapter plates 34, 36 include walls that define openings configured to cover and permit access to the face of an electrical device such as a duplex receptacle or a GFCI (ground fault circuit interrupter). A variety of mounting holes extend through each adapter plate, with the mounting holes configured to receive selected fasteners, e.g., mounting screws. The fasteners may engage apertures in an electrical box so as to secure outlet cover system 100 to the electrical box carrying the electrical device to be covered.

Adapter plate 32 is dimensioned so as to form an opening 44 configured to receive on its rear face at least one of a plurality of inserts 46, 48, 50, 52, 54. The inserts may effect a change in the dimensions of the opening such that the opening size selected will accommodate the face of an electrical device being installed. It should be noted that for convenience of illustration only, FIGS. 1 and 6 illustrate inserts 52 and 54 in front of adapter plate 32, whereas if selected, they may be inserted at the rear face of adapter plate 32. Adapter plate 32 may include a forwardly tapered chamfered wall 56, such that opening 44 is larger at the rear face of adapter plate 32 than at the front face. A frustum insert 46 or 52, having a matingly tapered external surface 58, 60 and a chamfered wall opening, may be seated in opening 44. Successive frustum inserts 48, 54, dimensioned as to form a smaller chamfered wall opening, may be nested within a rear face opening 62, 64 of the previously seated insert (46, 52, respectively). Adapter plate 32 and frustum inserts 46, 48, 50, 52, 54 may be dimensioned as to define openings to receive the face of a different electrical device.

Frustum insert 50 comprises a plug having such dimensions so as to define a rectangular toggle switch opening and may be seated in the opening of frustum insert 48. While frustum inserts, 46, 48, 52, and 54, by way of example only, comprise frustoconical rings, it should be appreciated that pyramidal or oval frustum inserts could be employed with such dimensions as to define noncircular and/or circular openings configured to accept the faces of electrical devices having corresponding shapes and/or other successively smaller frustum inserts.

Each of frustum inserts 46, 48, 50, 52, 54 includes a pair of radially extending diametrically opposed registration tabs 66 configured for placement within in correspondingly dimensioned recessed seats 68 formed in the rear face of the adapter plate 32, as well as the rear faces of the frustum inserts 46, 48, 52 and 54. A notch 70 may be disposed in each tab 66 and a post 72, projecting from each seat and may fit within the notch to secure the frustum insert against rotation or dislodgement from its opening within which it is received prior to complete assembly of the cover.

When the adapter plate 32 is fitted with one or more frustum inserts 46, 48, 50, 52, 54, engagement between the forwardly tapered chamfered walls and the tapered external surfaces of the frustum inserts maximizes abutting surface area contact assuring that the frustum inserts will not be dislodged. (i.e., pushed through the adapter plate opening 44 or the openings in the previously inserted frustum inserts).

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:
1. A outlet cover system comprising:
   a base including a top, a bottom, a first wall, a second wall, a third wall, and a fourth wall, wherein the first, second, third and fourth walls are disposed between the top and the bottom;
   an adapter plate including walls effective to define an opening to permit access to the face of an electrical device, the adapter plate sized and shaped so as to fit within the first, second, third and fourth walls;
   a cover;
   a coupling system effective to join the cover and the base, the coupling system comprising:
      a first half attached to the base, wherein the first half includes
         a base post, where the base post includes a first set of walls effective to define a first void with a first cross-section;
      a second half attached to the cover, wherein the second half includes:
         a follower post, wherein the follower post includes a second set of walls effective to define a second void with the first cross-section; and a receiver post, wherein the receiver post includes a third set of walls effective to define a third void with a second cross-section, and wherein:
the second cross-section is larger than the first cross-section, and
an alignment of the first, second, and third voids is effective to define a channel to allow an anchor to pass through the first, second, and third voids defined by the first, second, and third sets of walls.

2. The outlet cover system of claim 1, further comprising the anchor after an insertion of the anchor into the first, second, and third void is performed.

3. The outlet cover system of claim 1, wherein the anchor comprises:
a lid;
a shaft; and
a head, wherein the head includes a flare, wherein the flare is sized and shaped so as to compress inwardly toward the head when the anchor is inserted through the base post and follower post, and further sized and shaped so that the flare expands outwardly away from the head after the flare enters the receiver post.

4. The outlet cover system of claim 3, wherein the head includes walls shaped so as to define a recess, wherein the recess is sized and shaped so as to receive the flare when the flare compresses inwardly toward the head.

5. The outlet cover system of claim 3, wherein the head includes a rounded tip.

6. The outlet cover system of claim 1, wherein the anchor comprises:
a lid;
a shaft; and
a head, wherein the head includes a first and a second flare, wherein the first and the second flares are sized and shaped so as to compress inwardly toward the head when the anchor is inserted through the base post and follower post, and further sized and shaped so that the first and second flares expand outwardly away from the head after the first and second flares enter the receiver post.

7. The outlet cover system of claim 1, further comprising the anchor after an insertion of the anchor into the first, second, and third void is performed, wherein the anchor comprises:
a lid;
a shaft; and
a head, wherein the head includes a first and a second flare, wherein the first and the second flares are sized and shaped so as to compress inwardly toward the head when the anchor is inserted through the base post and follower post, and further sized and shaped so that the first and second flares expand outwardly away from the head after the first and second flares enter the receiver post;
wherein the head includes walls shaped so as to define recesses, wherein the recesses are sized and shaped so as to receive the flares when the flares compress inwardly toward the head; and
a rounded tip at the end of the head.

8. The outlet cover system of claim 1, wherein:
the first half includes first, second and third base posts; and
the second half includes first, second and third follower posts.

9. A method for forming an outlet cover system, the method comprising:
joining a cover with a base,
wherein the base includes a top, a bottom, a first wall, a second wall, a third wall, and a fourth wall, wherein the first, second, third and fourth walls are disposed between the top and the bottom;
placing an adapter plate inside the base, the adapter plate including walls effective to define an opening to permit access to the face of an electrical device, the adapter plate sized and shaped so as to fit within the first, second, third and fourth walls;
inserting an anchor into a coupling system, wherein the coupling system is effective to join the cover and the base, the coupling system comprising:
a first half attached to the base, wherein the first half includes
a base post, where the base post includes a first set of walls effective to define a first void with a first cross-section; and
a second half attached to the cover, wherein the second half includes:
a follower post, wherein the follower post includes a second set of walls effective to define a second void with the first cross-section; and
a receiver post, wherein the receiver post includes a third set of walls effective to define a third void with a second cross-section, and wherein:
the second cross-section is larger than the first cross-section, and
inserting the anchor into the coupling system includes inserting the anchor into a channel defined by an alignment of the first, second, and third voids defined by the first, second, and third sets of walls.

10. The method of claim 9, wherein the anchor comprises:
a lid;
a shaft; and
a head, wherein the head includes a flare, wherein the flare is sized and shaped so as to compress inwardly toward the head when the anchor is being inserted through the base post and follower post, and further sized and shaped so that the flare expands outwardly away from the head after the flare passes the receiver post.

11. The method of claim 9, wherein the anchor comprises:
a lid;
a shaft; and
a head, wherein the head includes a first and a second flare, wherein the first and the second flares are sized and shaped so as to compress inwardly toward the head when the anchor is inserted through the base post and follower post, and further sized and shaped so that the first and second flares expand outwardly away from the head after the first and second flares enter the receiver post.

12. The method of claim 11, wherein the head includes walls shaped so as to define recesses, wherein the recesses are sized and shaped so as to receive the flares when the flares compress inwardly toward the head.

13. The method of claim 12, wherein the head includes a rounded tip.

14. The method of claim 9, wherein the anchor comprises:
an anchor lid;
an anchor shaft; and
a rounded head, wherein the head includes a first and a second flare, wherein the first and the second flares are sized and shaped so as to compress inwardly toward the head when the anchor is inserted through the base post and follower post, and further sized and shaped so that the first and second flares expand outwardly away from the head after the first and second flares enter the receiver post;
wherein the head includes walls shaped so as to define recesses, wherein the recesses are sized and shaped so as to receive the flares when the flares compress inwardly toward the head; and
a rounded tip at the end of the head.

15. A outlet cover system comprising:
a base including a top, a bottom, a first wall, a second wall, a third wall, and a fourth wall, wherein the first, second, third and fourth walls are disposed between the top and the bottom;
a cover;
a coupling system effective to join the cover and the base, the coupling system comprising:
  a first half attached to the base, wherein the first half includes
    a base post, where the base post includes a first set of walls effective to define a first void with a first cross-section;
  a second half attached to the cover, wherein the second half includes:
    a follower post, wherein the follower post includes a second set of walls effective to define a second void with the first cross-section; and
    a receiver post, wherein the receiver post includes a third set of walls effective to define a third void with a second cross-section, and wherein:
      the second cross-section is larger than the first cross-section, and
      an alignment of the first, second, and third voids is effective to define a channel to allow an anchor to pass through the first, second, and third voids defined by the first, second, and third sets of walls.

16. The outlet cover system of claim 15, further comprising the anchor after an insertion of the anchor into the first, second, and third void is performed.

17. The outlet cover system of claim 15, wherein the anchor comprises:
a lid;
a shaft; and
a head, wherein the head includes a first and a second flare, wherein the first and the second flares are sized and shaped so as to compress inwardly toward the head when the anchor is inserted through the base post and follower post, and further sized and shaped so that the first and second flares expand outwardly away from the head after the first and second flares enter the receiver post.

18. The outlet cover system of claim 17, wherein the head includes walls shaped so as to define recesses, wherein the recesses are sized and shaped so as to receive the flares when the flares compress inwardly toward the head.

19. The outlet cover system of claim 15, further comprising the anchor after an insertion of the anchor into the first, second, and third void is performed, wherein the anchor comprises:
an anchor lid;
an anchor shaft; and
a rounded head, wherein the head includes a first and a second flare, wherein the first and the second flares are sized and shaped so as to compress inwardly toward the head when the anchor is inserted through the base post and follower post, and further sized and shaped so that the first and second flares expand outwardly away from the head after the first and second flares enter the receiver post;
wherein the head includes walls shaped so as to define recesses, wherein the recesses are sized and shaped so as to receive the flares when the flares compress inwardly toward the head; and
a rounded tip at the end of the head.

20. The outlet cover system of claim 15, wherein:
the first half includes first, second and third base posts; and
the second half includes first, second and third follower posts.

* * * * *